(12) United States Patent
Fujita

(10) Patent No.: US 7,009,729 B2
(45) Date of Patent: Mar. 7, 2006

(54) ELECTROPHOTOGRAPHIC IMAGE FORMING APPARATUS AND IMAGE FORMING PROGRAM PRODUCT THEREFOR

(75) Inventor: Toru Fujita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 806 days.

(21) Appl. No.: 09/923,241

(22) Filed: Aug. 3, 2001

(65) Prior Publication Data

US 2002/0067511 A1 Jun. 6, 2002

(30) Foreign Application Priority Data

Aug. 3, 2000 (JP) .............................. 2000-235214

(51) Int. Cl.
*G06K 15/00* (2006.01)
(52) U.S. Cl. ....................... 358/1.3; 358/1.8; 358/3.06; 358/3.12; 358/3.23; 358/1.16
(58) Field of Classification Search ............... 358/471, 358/401, 1.3, 1.8, 3.01, 3.06, 3.11, 3.12, 3.23, 358/1.16
See application file for complete search history.

(56) References Cited

U.S. PATENT DOCUMENTS

| | | | |
|---|---|---|---|
| 5,187,495 A | | 2/1993 | Tanimoto et al. ........... 346/108 |
| 5,327,167 A | | 7/1994 | Pollard et al. .............. 346/108 |
| 5,751,846 A | * | 5/1998 | Higgins-Luthman et al. .... 382/169 |
| 5,761,070 A | * | 6/1998 | Conners et al. ............. 700/223 |
| 6,459,416 B1 | * | 10/2002 | Sasaki et al. ................. 345/89 |
| 6,625,326 B1 | * | 9/2003 | Cho ........................... 382/266 |

FOREIGN PATENT DOCUMENTS

| EP | 0 634 862 A1 | 1/1995 |
|---|---|---|
| EP | 0 680 195 A1 | 11/1995 |
| EP | 0 843 232 A2 | 5/1998 |
| EP | 0 954 165 A2 | 11/1999 |

OTHER PUBLICATIONS

European Search Report (3 pages); dated Nov. 16, 2001.

* cited by examiner

*Primary Examiner*—Jerome Grant, II
(74) *Attorney, Agent, or Firm*—Osha Liang LLP

(57) ABSTRACT

An electrophotographic image forming apparatus uses a halftone spot consisting of multiple dot images formed in pixel areas so as to represent a gray scale and to reproduce an image. It has a halftone processor for generating image reproduction data for each pixel by referring to a transformation table wherein gray level data for the image and correlated image reproduction data are stored. The transformation table includes first look-up tables that each store gray level data and correlated first image reproduction data, including size data for virtual dots, each of which corresponds to one of the dot images, second look-up tables that each store gray level data and correlated second image reproduction data, including size data for virtual dots, each of which corresponds to one of the dot images, and a pattern matrix, elements of which are correlated with multiple pixels in a predetermined area of an image and each indicate one of the first look-up tables and one of the second look-up tables that are to be referred to.

13 Claims, 12 Drawing Sheets

EXAMPLE OF HALFTONE SPOT

EXAMPLE OF HALFTONE SPOT (1) HALFTONE SPOT SHAPE    (2) VIRTUAL DOT TO OBTAIN HALFTONE SPOT SHAPE
*FIG. 2 (A)*
LOW GRAY LEVEL
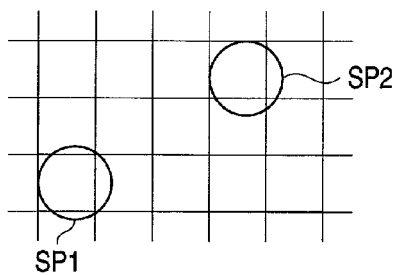
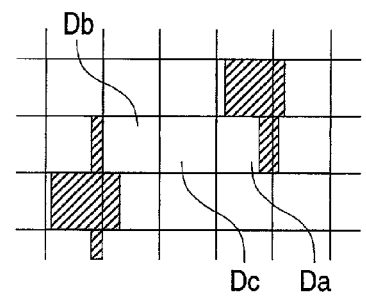
*FIG. 2 (B)*
INTERMEDIATE GRAY LEVEL
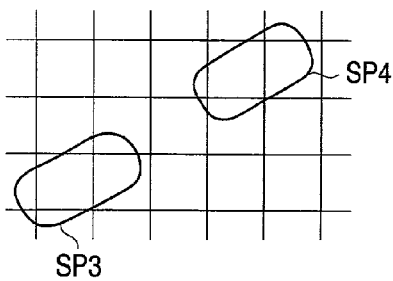
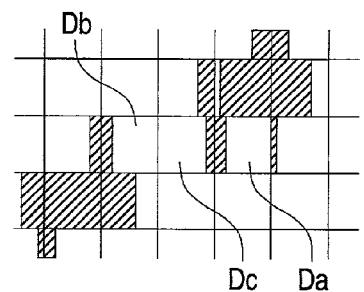
*FIG. 2 (C)*
HIGH GRAY LEVEL
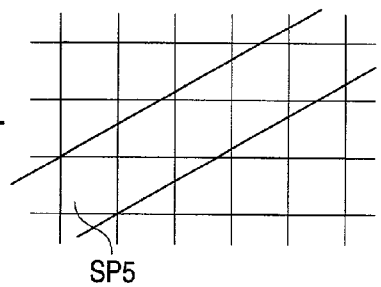
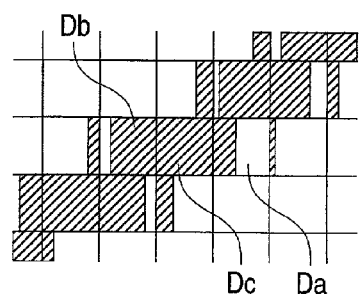

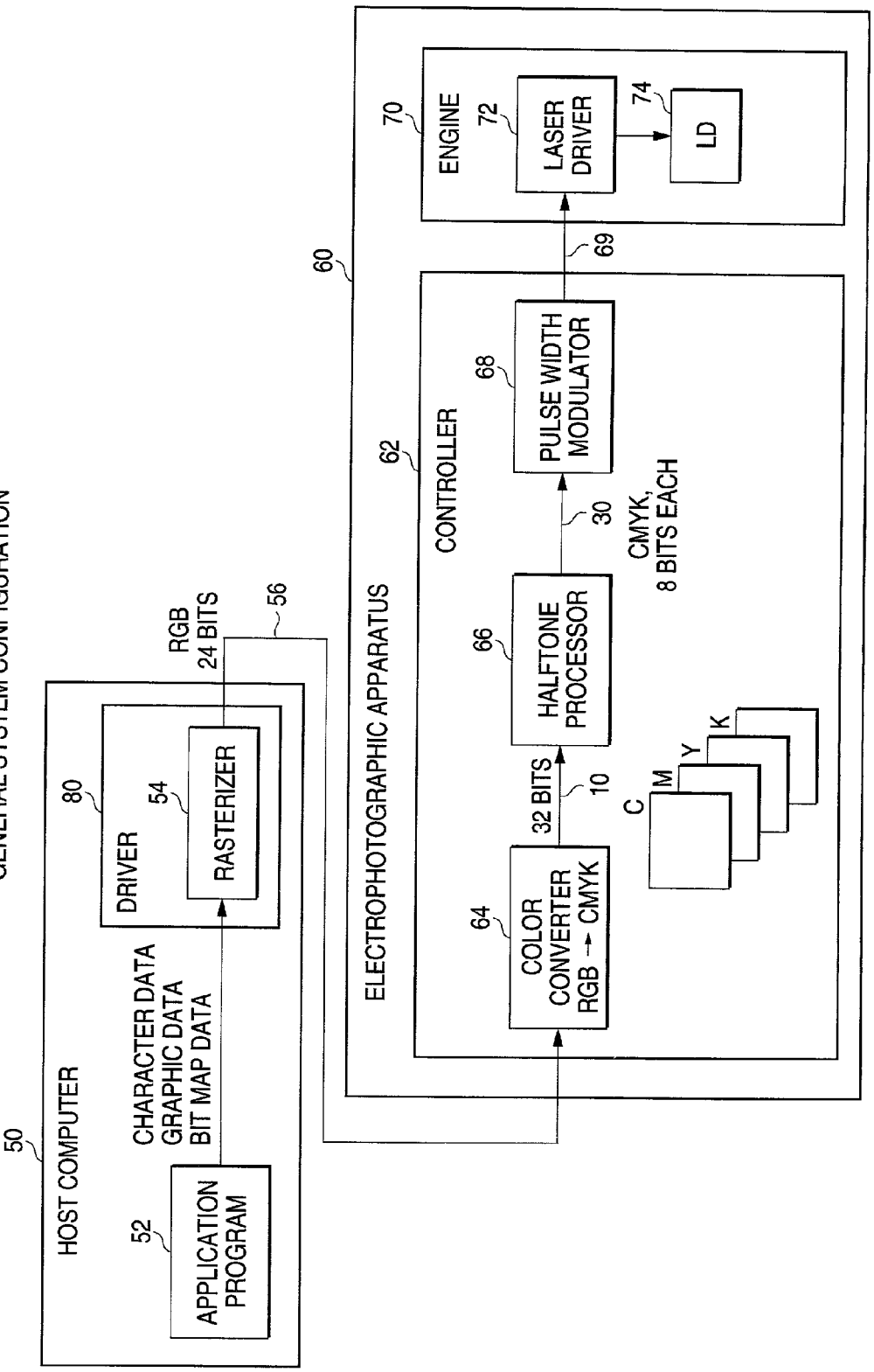

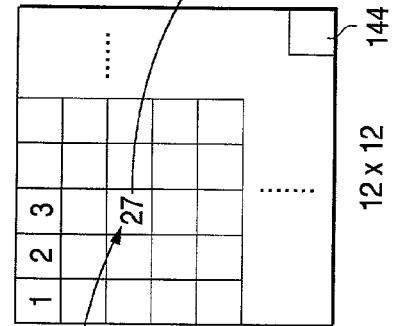
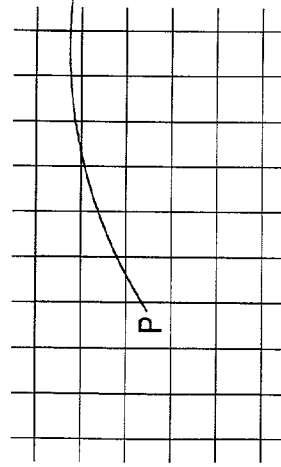
FIG. 4(A) IMAGE DATA
FIG. 4(B) PATTERN MATRIX
FIG. 4(C) LOOK-UP TABLE GROUP
TRANSFORMATION TABLE (1)

POSITION LOOK-UP TABLE (POSITION DATA FOR ONE BIT)

POSITION LOOK-UP TABLE (POSITION DATA FOR MULTIPLE BITS)

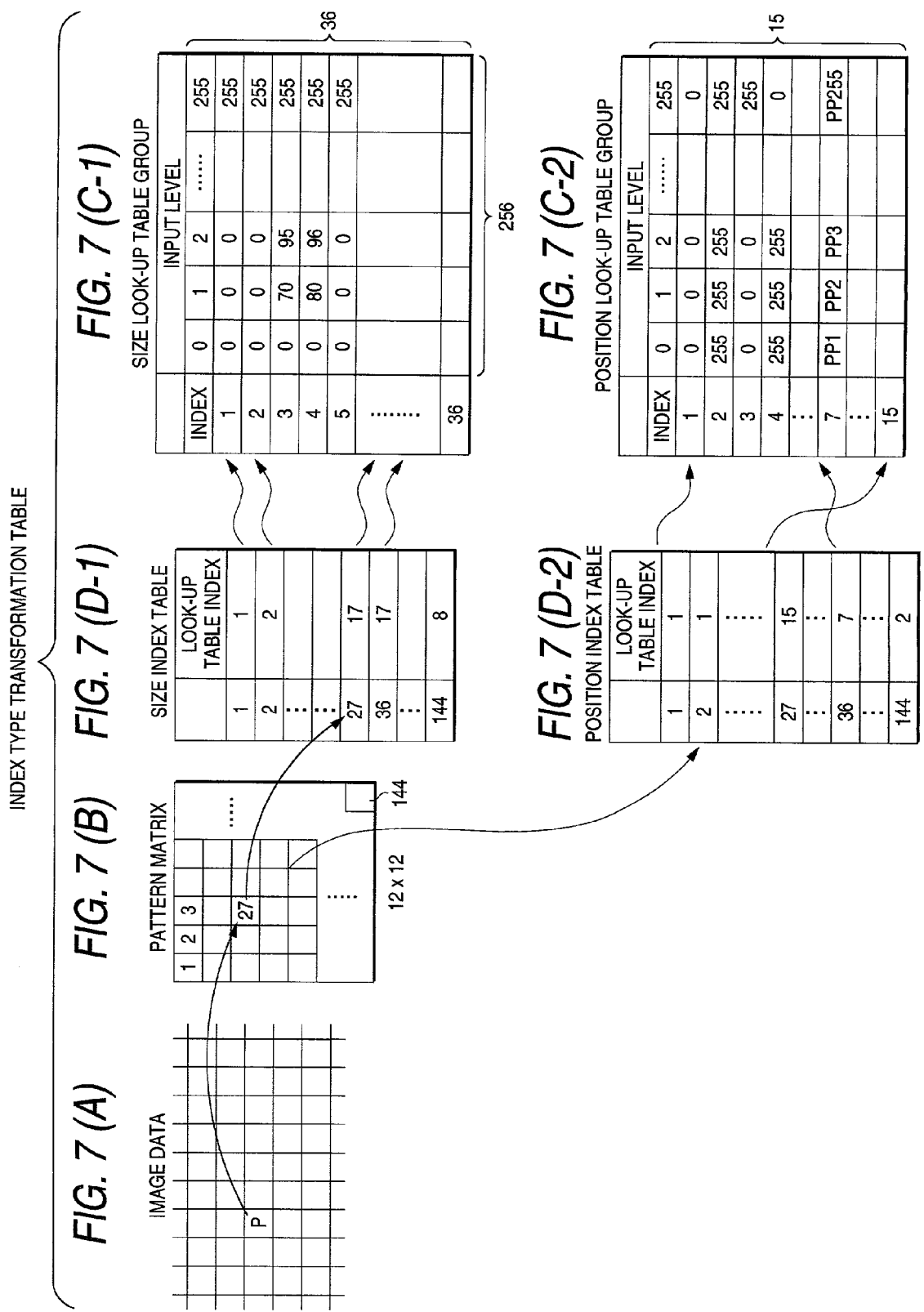

INDEX TYPE TRANSFORMATION TABLE

FIG. 8 (B-1)
SIZE PATTERN MATRIX
12 x 12

FIG. 8 (C-1)
SIZE LOOK-UP TABLE GROUP

| INDEX \ INPUT LEVEL | 0 | 1 | ... | 254 | 255 |
|---|---|---|---|---|---|
| 1 | 0 | 18 | ... | 254 | 255 |
| ... | | | | | |
| 27 | 0 | 0 | ... | 220 | 255 |
| ... | | | | | |
| 36 | 0 | 0 | ... | 255 | 255 |

FIG. 8 (B-2)
POSITION PATTERN MATRIX
12 x 12

FIG. 8 (C-2)
POSITION LOOK-UP TABLE GROUP

| INDEX \ INPUT LEVEL | 0 | 1 | ... | 254 | 255 |
|---|---|---|---|---|---|
| ... | | | | | |
| 7 | PP1, PP2 | ... | PP254, PP255 | | |
| ... | | | | | |
| 15 | PP1, PP2 | ... | PP254, PP255 | | |

FIG. 9

EXAMPLE OF PATTERN MATRIX

| D1, 1 | | | D1, 4 | | | D2, 7 | | | D3, 10 | | |
|---|---|---|---|---|---|---|---|---|---|---|---|
| 1 | 2 | 3 | 1 | 4 | 5 | 6 | 7 | 8 | 9 | 4 | 10 |
| 11 | 12 | 13 | 9 | 14 | 15 | 1 | 6 | 13 | 6 | 7 | 16 |
| 4 | 8 | 17 | 18 | 12 | 19 | 20 | 5 | 15 | 1 | 14 | 3 |
| 14 | 21 | 15 | 20 | 16 | 9 | 18 | 22 | 17 | 11 | 16 | 15 |
| 23 | 10 | 9 | 5 | 3 | 24 | 6 | 10 | 9 | 18 | 8 | 6 |
| 8 | 25 | 11 | 23 | 10 | 20 | 8 | 3 | 26 | 17 | 21 | 9 |
| 27 | 15 | 6 | 16 | 28 | 11 | 12 | 2 | 11 | 29 | 3 | 1 |
| 16 | 9 | 8 | 13 | 15 | 17 | 10 | 26 | 11 | 22 | 17 | 18 |
| 25 | 20 | 30 | 5 | 6 | 22 | 13 | 24 | 31 | 21 | 26 | 4 |
| 32 | 33 | 5 | 21 | 4 | 23 | 14 | 4 | 12 | 13 | 1 | 14 |
| 33 | 4 | 14 | 15 | 17 | 10 | 3 | 4 | 22 | 2 | 11 | 34 |
| 6 | 7 | 8 | 6 | 35 | 5 | 24 | 36 | 27 | 15 | 20 | 8 |

D7, 12

D10, 12

D10, 11

EXAMPLE OF GROWN HALFTONE SPOTS

FIG. 11

TRANSFORMATION TABLE FOR THIRD EMBODIMENT (B) PATTERN MATRIX

D1,1    D1,4    D2,7    D3,10

| 1 PP | 2 PP | 3 PP | 1 PP | 4 PP | 5 PP | 6 PP | 7 PP | 8 PP | 9 PP | 4 PP | 10 PP |
|---|---|---|---|---|---|---|---|---|---|---|---|
| 11 PP | 12 PP | 13 PP | 9 PP | 14 PP | 15 PP | 1 PP | 6 PP | 13 PP | 6 PP | 7 PP | 16 PP |
| 4 PP | 8 PP | 17 PP | 18 PP | 12 PP | 19 PP | 20 PP | 5 PP | 15 PP | 1 PP | 14 PP | 3 PP |
| 14 PP | 21 PP | 15 PP | 20 PP | 16 PP | 9 PP | 18 PP | 22 PP | 17 PP | 11 PP | 16 PP | 15 PP |
| 23 PP | 10 PP | 9 PP | 5 PP | 3 PP | 24 PP | 6 PP | 10 PP | 9 PP | 18 PP | 8 PP | 6 PP |
| 8 PP | 25 PP | 11 PP | 23 PP | 10 PP | 20 PP | 8 PP | 3 PP | 26 PP | 17 PP | 21 PP | 9 PP |
| 27 PP | 15 PP | 6 PP | 16 PP | 28 PP | 11 PP | 12 PP | 2 PP | 11 PP | 29 PP | 3 PP | 1 PP |
| 16 PP | 9 PP | 8 PP | 13 PP | 15 PP | 17 PP | 10 PP | 26 PP | 11 PP | 22 PP | 17 PP | 18 PP |
| 25 PP | 20 PP | 30 PP | 5 PP | 6 PP | 22 PP | 13 PP | 24 PP | 31 PP | 21 PP | 26 PP | 4 PP |
| 32 PP | 33 PP | 5 PP | 21 PP | 4 PP | 23 PP | 14 PP | 4 PP | 12 PP | 13 PP | 1 PP | 14 PP |
| 33 PP | 4 PP | 14 PP | 15 PP | 17 PP | 10 PP | 3 PP | 4 PP | 22 PP | 2 PP | 11 PP | 34 PP |
| 6 PP | 7 PP | 8 PP | 6 PP | 35 PP | 5 PP | 24 PP | 36 PP | 27 PP | 15 PP | 20 PP | 8 PP |

D7,12

D10,12

D10,11

(C) SIZE LOOK-UP TABLE GROUP

| INDEX | INPUT LEVEL | | | | |
|---|---|---|---|---|---|
| | 0 | 1 | 2 | ...... | 255 |
| 1 | 0 | 0 | 0 | | 255 |
| 2 | 0 | 0 | 0 | | 255 |
| 3 | 0 | 70 | 95 | | 255 |
| 4 | 0 | 80 | 96 | | 255 |
| 5 | 0 | 0 | 0 | | 255 |
| ⋮ | | | | | |
| 36 | | | | | |

36

256

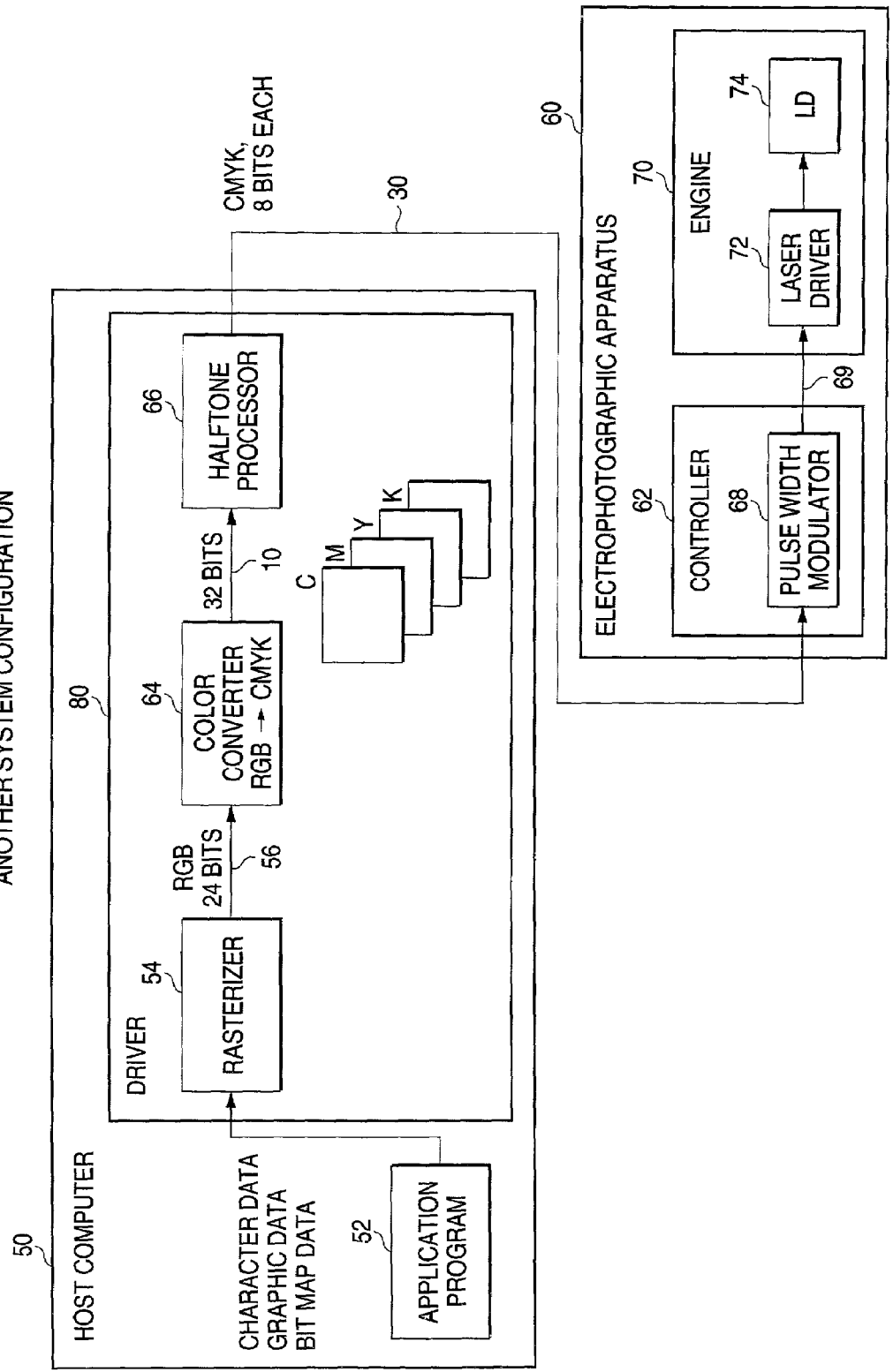

ELECTROPHOTOGRAPHIC IMAGE FORMING APPARATUS AND IMAGE FORMING PROGRAM PRODUCT THEREFOR

BACKGROUND OF THE INVENTION

1. Field of the Invention

The present invention relates to an electrophotographic image forming apparatus and an image forming program therefor, for performing a halftone process using halftone spots each consisting of multiple dot images. In particular, the present invention pertains to an innovative image forming apparatus and an image forming program product therefor, used to improve image quality by forming virtual dots at a desired printed dot gain at desired locations in a pixel area.

The present application is based on Japanese Patent Application No. 2000-235214, which is incorporated herein by reference.

2. Description of the Related Art

To reproduce a color image, a color electrophotographic apparatus that is widely employed in color printers and color copiers uses cyan (C), magenta (M), yellow (Y) and black (K) toner to develop a latent image formed by exposing a photosensitive member, and then, to prepare the final image, transfers the toner image to an image bearing member, such as a paper sheet. A laser beam printer that employs a laser beam to form a latent image on a photosensitive member controls laser beam emissions for individually scanning pixels arranged in the main scanning direction, in which the laser beam is emitted, and in the sub-scanning direction, in which the image bearing member is fed. Above all, a laser beam printer of a type that can change the width of a pulse used for emitting a laser beam can variously change the region in a pixel area that is irradiated by the laser beam. Even when only a small number of pixels are present in a unit area, this type of laser beam printer can provide a color image reproduction having a higher resolution and a larger number of gray levels.

For a laser beam printer of the pulse width change type, as one of the density tone reproduction methods used for images, a multi-level dithering, half-tone spot half-toning printing method is employed. According to the multi-level dithering method, upon the receipt of signals containing gray level data for colors, a transformation table, called a look-up table, in which reproduction data are stored is referred to, and appropriate data are extracted to determine the sizes of virtual dots and their locations in individual pixel areas. Since multiple levels, extending from 0 to a maximum value, are set as sizes, the outputs of the pixels are "multi-leveled".

A "virtual dot" is defined as an area that is scanned by a laser beam in the process of forming a final, toner "dot image". The size of such a virtual dot in the main scanning direction is equal to the product of the time and the speed whereat the laser beam is driven, and in the sub-scanning direction, is equal to the length of a pixel area. Since for the above and following reasons the shapes of virtual dots making up a final "dot image" differ, these dots are described as being individually distinguished. In the processing for producing a dot image, a laser beam is driven that irradiates virtual dots in pixel areas on a photosensitive member, and forms an irradiated region that, depending on the size and the leading and trailing characteristics of the laser beam, is shaped like a smeared virtual dot. In the thus prepared irradiated region on the photosensitive member, a latent image is produced that can be developed using toner and transferred to an image bearing member, such as paper, to produce a final, dot image. The shape of this dot image reflects the shapes of the virtual dots, for which further changes are engendered by the scattering of toner. Thus, since as is described above a dot image is composed of virtual dots that have undergone changes, and since the virtual dot changes are induced by the electrophotographic processing that is performed, the shape of a dot image can be controlled by processing adjustments made to alter the shapes of virtual dots.

According to the halftone-spot half toning method, a halftone spot that is formed consists of a dot image in a single pixel, or a group of dot images distributed among multiple adjacent pixels, and the gray level of an image is reproduced in accordance with the size of halftone spots. That is, as the density value of the gray level data for each pixel is increased, a virtual dot is generated, as is a growth core for a halftone spot in a final image. Then, when the density value of the gray level data is further increased, the number and the ratio of the virtual dots is likewise increased, while the size of the halftone spot is gradually enlarged. Therefore, in accordance with the method for growing a halftone spot in consonance with an increase in the density value of the gray level data that is input, the area of a virtual dot grows rapidly at pixels near the center of the halftone spot (near the growth core), and grows slowly at pixels around the circumference of the halftone spot (distant from the growth core).

In order to form a high quality image using an electrophotographic apparatus, the method used to grow a dot image in a pixel area must be optimized. For example, for most electrophotographic apparatuses it is well known that a high quality image can be obtained by using a method that increases the area of an isolated halftone spot at a low gray level, and by increasing the area size by connecting adjacent halftone spots at a high gray level and forming a line along a screen angle. One of the reasons for this is as follows. As previously described, since an electrophotographic apparatus employs light, such as a laser beam, to form a latent image, the portion of a latent image around a halftone spot is blurred, and since the latent image is developed by attaching charged toner that is adversely affected by the ambient temperature and humidity, image reproductivity for the image developed around the halftone spot is deteriorated. Therefore, when a line is formed by connecting halftone spots to the extent as possible, the distance around the circumference of a halftone spot can be reduced, and the image reproductivity by the development can be improved. Thus, at a low gray level whereat the halftone spots can not be connected, the area of each separate halftone spot is increased, and at an intermediate gray level or higher, a line is formed by connecting the halftone spots arranged along the screen angle, and the area of the line is increased.

When such a halftone-spot growing method is employed, for the virtual dot formed in the pixel area it is necessary not only that its size be changed but also that the position (development position) thereof be changed in accordance with the gray level.

However, the conventional image forming method takes into consideration only the changing of a laser driving pulse corresponding to the size of the virtual dot in the pixel area, and does not take into consideration the changing in the position of the virtual dot in the pixel area. Therefore, the changing of the position of the virtual dot in the pixel area in accordance with the input gray level, as described above, is not performed.

SUMMARY OF THE INVENTION

It is, therefore, one objective of the invention to provide an electrophotographic image forming method and an apparatus therefor for forming an image having a high quality by controlling the position of a virtual dot in a pixel area.

It is another objective of the invention to provide an electrophotographic image forming method and an apparatus therefor for flexibly changing the position of a virtual dot in a pixel area, without increasing the capacity of a transformation table from which image reproduction information is obtained that is used to distinguish a virtual dot from an input gray level.

To achieve the above objectives, according to a first aspect of the invention, an electrophotographic image forming apparatus, for using a halftone spot consisting of multiple dot images formed in pixel areas so as to represent a gray scale and to reproduce an image, comprises: a halftone processor for generating image reproduction data for each pixel by referring to a transformation table wherein gray level data for the image and correlated image reproduction data are stored, wherein the transformation table includes a group of look-up tables, in each of which gray level data and correlated image reproduction data are stored, and a pattern matrix, elements of which are so correlated with multiple pixels in a predetermined area of an image that each indicates a look-up table to be referred to, and wherein the image reproduction data stored by each of the look-up tables includes size data and position data for virtual dots, each of which corresponds to one of the multiple dot images.

According to the preferred embodiments of the invention, the image reproduction data stored by at least one of the look-up tables includes different position data in accordance with gray level. More preferably, the position data for the virtual dots is information concerning whether the virtual dots are located on the left or on the right in a pixel area. Or, the position data for the virtual dots can be information concerning the location (not only on the left or on the right, but also at intermediate locations) of the virtual dots in a pixel area that is consonant with gray levels.

According to the first aspect, since the positioning of virtual dots can be changed as desired in accordance with gray levels, high quality images can be generated.

According to a second aspect of the invention, an electrophotographic image forming apparatus, for using a halftone spot consisting of multiple dot images formed in pixel areas so as to represent a gray scale and to reproduce an image, comprises: a halftone processor for generating image reproduction data for each pixel by referring to a transformation table wherein gray level data for the image and correlated image reproduction data are stored, wherein the transformation table includes a first group of look-up tables that each store gray level data and correlated first image reproduction data, including size data for virtual dots, each of which corresponds to one of the dot images, a second group of look-up tables that each store gray level data and correlated second image reproduction data, including size data for virtual dots, each of which corresponds to one of the dot images, and a pattern matrix, elements of which are correlated with multiple pixels in a predetermined area of an image and each indicate one of the first look-up tables and one of the second look-up tables that are to be referred to, and wherein the number of the first look-up tables and the number of the second look-up tables is smaller than the number of pixels in the pattern matrix.

According to the second aspect of the invention, in the first look-up table group that corresponds to all the elements of the pattern matrix, multiple tables are collected that store size data for similar virtual dots, so that the number of tables is smaller than that which originally was required. Similarly, in the second look-up table group, multiple tables are collected that store position data for similar dots, so that again the number of tables is smaller than that which was originally required. As a result, the total amount of data stored by the transformation table can be reduced, and therefore, position data for virtual dots that are changed in accordance with gray levels can be stored by the transformation table with no increase in memory capacity, which will enable the generation of high quality images.

According to the first and the second aspects of the invention, at a low gray level it is easy to grow a halftone spot comprising a group of dot images while the intervals between them are maintained, and at a higher gray level a halftone spot can be grown like a line by being connected along the screen angle.

According to a third aspect of the invention, an electrophotographic image forming apparatus, for using a halftone spot consisting of multiple dot images formed in pixel areas so as to represent a gray scale and to reproduce an image, comprises: a halftone processor for generating image reproduction data for each pixel by referring to a transformation table wherein gray level data for the image and correlated image reproduction data are stored, wherein the transformation table includes a group of look-up tables in which gray level data are stored along with correlated image reproduction data, and a pattern matrix, elements of which are correlated with multiple pixels in a predetermined area of an image and each indicate one of the look-up tables to be referred to, and wherein, in addition to the look-up tables to be referred to, the pattern matrix includes position data for virtual dots, which each correspond to one of the dotted images.

According to the third aspect, since the look-up table to be referred to and the position data for the virtual dots are included in the pattern matrix, the position data for each pixel can be stored in the transformation table of the halftone processor, and high quality images can be generated.

Features and advantages of the invention will be evident from the following detailed description of the preferred embodiments described in conjunction with the attached drawings.

BRIEF DESCRIPTION OF THE DRAWINGS

In the accompanying drawings:

FIG. 2 is a diagram showing an example of a halftone spot growing method for which the invention is applied;

FIG. 3 is a schematic diagram showing the configuration of an electrophotographic printing system comprising an image forming apparatus according to the invention;

FIG. 4 is a diagram showing an example of a transformation table for the image forming apparatus according to a first embodiment of the invention;

FIG. 7 is a diagram showing an example of index type transformation tables according to a second embodiment of the invention;

FIG. 8 is a diagram showing another example of index type transformation tables according to the second embodiment of the invention;

FIG. 9 is a specific diagram showing an example of an index type pattern matrix;

FIG. 11 is a diagram showing an example of a transformation table according to a third embodiment of the invention; and FIG. 12 is a diagram showing another configuration for an electrophotographic printing system.

DETAILED DESCRIPTION OF THE PREFERRED EMBODIMENTS

The preferred embodiments of the present invention will now be described. It should be noted, however, that the technical scope of the invention is not limited to these embodiments.

Figure 1:
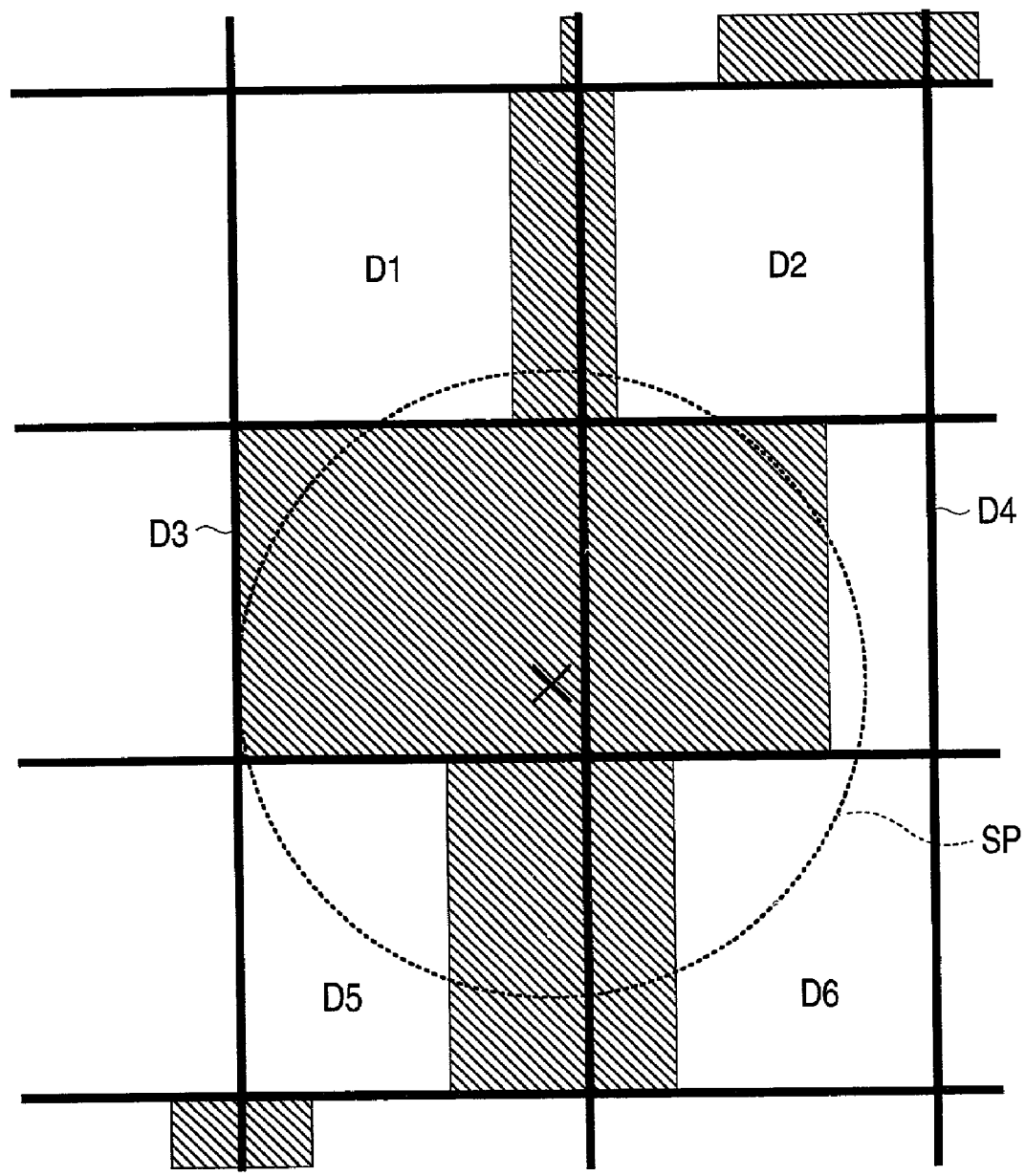
FIG. 1 is a diagram showing an example of a halftone spot for the invention.

FIG. 1 is a diagram showing an example of a halftone spot for the invention. In this example, a virtual dot indicated as a black portion is formed in pixel areas D1 to D6 arranged, for example, at pitches of 6000 dpi, and one halftone spot SP consisting of a group of dot images is generated. The generation of the halftone spot SP will now be explained by using a laser beam printer employing a laser beam whose pulse width is changed based on image reproduction data.

On the right in the pixel area D1 in FIG. 1, a virtual dot, formed by a laser beam emitted from a corresponding location, occupies a space covering about one quarter of the area. Vertically, the laser beam has a height corresponding, for example, to the height of the pixel area, and it strikes a desired region while scanning is performed horizontally (in the main scanning direction). Therefore, for the pixel area D1, the pulse for driving the laser beam has a timing (positioning) and a width that correspond to about one quarter of the right portion of the pixel area. The location of a virtual dot can be changed by controlling the timing, and the size of a virtual dot can be changed by controlling the pulse width.

The pixel area D2 is adjacent to the pixel area D1, and a virtual dot on the left covers about one tenth of the area. Thus, the virtual dot is coupled with the virtual dot in the adjacent pixel area D1, and together they provide a virtual dot having a predetermined width. Further, in the pixel area D3, a virtual dot is formed that covers the entire area, and in the adjacent pixel area D4, a virtual dot on the left covers about two thirds of the area. Thus, the virtual dots in the pixel areas D3 and D4 form a thick virtual dot. Similarly, a virtual dot covers about half of the right side of pixel area D5, while a virtual dot covers about one quarter of the left side of the pixel area D6.

A laser beam is emitted based on these virtual dots, and a dot image is formed through a development and transferring processes. For the halftone spot SP in FIG. 1, the dot images formed in the pixel areas D1 and D2 are narrower than those formed in the pixel areas D5 and D6, and the dot images formed in the paired adjacent pixel areas D1 and D2, D3 and D4, and D5 and D6 are all shifted to the left in their respective combined areas. As a result, as is indicated by X in FIG. 1, the position of the center of gravity (the center of the halftone spot) of the halftone spot formed by the pixel areas D1 to D6 is positioned slightly above and to the left of the center of the area formed by pixel areas D3 to D6. Furthermore, when the virtual dot in the pixel area D2 is located on the left and the virtual dot in the pixel area D5 is located on the right, the halftone spot SP in the final image is separated from halftone spots that are generated above and below along the screen angle. Thus, if the positions of the virtual dots in the pixel areas D2 and D5 were shifted, for example, to the center and the left, the halftone spot SP would be connected to a halftone spot generated above or below, and a line along the screen angle would be formed.

As is described above, the shape of a dot image does not completely match the shape of virtual dots indicated by solids in FIG. 1, and accordingly, the shape of a halftone spot formed of these dot images is as indicated by the broken line in FIG. 1. Or, as is described above, when the positions of the virtual dots are shifted within the pixel area, the halftone spot will be connected to an adjacent halftone spot and form a line. Therefore, when the position of a virtual dot is changed in accordance with a gray level, arbitrarily, halftone spots can be separated from each other, or can be connected together to form a line.

FIG. 2(A) to 2(C) are diagrams showing an example of a halftone spot growing method for which the invention is applied. In FIGS. 2(A) to 2(C), the shapes of halftone spots (1) and corresponding virtual dots (2) are displayed horizontally, and (A) a low gray level, (B) an intermediate gray level and (C) a high gray level are displayed vertically.

As is described above, in the area (A) for a low gray level, virtual dots is formed in the pixel area in the center of halftone spots. As a result, halftone spots SP1 and SP2 are formed separately, as indicated by comparatively small circles. In this case, a virtual dot corresponding to the right halftone spot SP2 covers all but about one third of a pixel area, being close to the right. Further, no virtual dots are generated in the pixel areas Db and Dc.

In the area (B) for an intermediate gray level, the halftone spots SP1 and SP2 generated at the low gray level grow by being extended in the oblique direction along the screen angle and produce elliptic halftone spots SP3 and SP4. In order to obtain this growth, while a virtual dot is formed in the right portion of the pixel area Da at the low gray level, at the intermediate level, the position of the virtual dot in Da is shifted toward the virtual dot Dc. Thereby permitting the formation of the elliptic shaped halftone spot SP4.

In the area (C) for a high gray level, the elliptical shaped printing points SP3 and SP4 formed at the intermediate gray level are connected along the screen angle and grow to form a line. Thus, the entire pixel area Dc is defined as a virtual dot area, and in the pixel area Db, whereas at the intermediate gray level a virtual dot was formed on the left, at the high gray level the position of the virtual dot is shifted to the right. As a result, the two halftone spots SP3 and SP4 are connected together.

As is shown in FIG. 2, since the virtual dots are formed so that their positions differ in accordance with the gray levels, the halftone spots grow at the intervals between the low gray level, while at the intermediate or the high gray level, the halftone spots are connected and grow as in a line. Therefore, the development process performed by the toner attachment can be stabilized and high quality images can be formed.

FIG. 3 is a schematic diagram showing the configuration of an electrophotographic printing system that incorporates the image forming apparatus of this invention. In this example, a host computer 50 generates image data 56 consisting of gray level data (a total of 24 bits, in sets of eight bits each) for RGB, and transmits the image data 56 to an electrophotographic apparatus 60, such as a page printer. The electrophotographic apparatus 60, such as a page printer, reproduces a color image based on the received image data 56. Included in the electrophotographic apparatus 60 is a controller 62, for performing image processing and supplying a laser drive pulse 69 to an engine 70, and the engine 70, for reproducing images based on the drive pulse 69.

The host computer 50 employs application programs 52, such as a word processor and a graphic tool, to generate character data, graphic data and bit map data. The data generated by the application programs 52 are rasterized by a rasterization function 54 of a driver 80, which is installed in the host computer 50 and is used for the electrophotographic apparatus 60, and the rasterized data are converted into the image data 56, which consist of the gray level data for the individual RGB signals for each pixel. In this example, the image data 56 are data for 256 gray levels provided by a total of 24 bits, 8 bits for each RGB signal.

A microprossor (not shown) is incorporated in the electrophotographic apparatus 60, and together, the microprocessor and an installed control program constitute a controller 62, which includes a color converter 64, a halftone processor 66 and a pulse width modulator 58. Further, in the engine 70, based on the drive data 69, a laser drier 72 drives an image drawing laser diode 74. While the engine 70 also includes a photosensitive drum, a transfer belt and a drive unit therefor, these components are not shown in FIG. 3.

The color converter 64 in the controller 62 converts the RGB gray level data received for each pixel into CMYK gray level data 10, which are toner colors. The CMYK gray level data 10 are data supplied for each pixel, eight bits for each of the CMYK color planes, and at the maximum, provide 256 gray levels. The halftone processor 66 receives the gray level data 10 corresponding to the pixel for each color plane.

Upon the receipt of the gray level data 10 for each pixel, the halftone processor 66 generates the image reproduction data 30 for pertinent pixels by referring to a transformation table that is prepared in advance and that includes gray level data and correlated image reproduction data. The halftone processor 66 is an image forming unit that employs a multi-level dithering method to generate the image reproduction data 30 that represent the intermediate gray level. The transformation table is prepared as follows.

FIGS. 4(A) to 4(C) are diagrams showing an example transformation table for the image forming apparatus according to a first embodiment. As was previously described, this transformation table is stored in the halftone processor 66 memory that is internally provided in the controller of the electrophotographic apparatus 60. The image data in FIG. 4(A) includes gray level data for the individual light and dark colors for each pixel.

The transformation table that includes the pattern matrix in FIG. 4(B) and the look-up table group in FIG. 4(C) is correlated with the image data. In this example, the pattern matrix is a 12×12 matrix, and the look-up tables corresponding to the elements i (i=1 to 144) of the pattern matrix are stored in the look-up table group in FIG. 4(C). The pattern matrix is correlated with a predetermined pixel in the image data. And for example, when a pattern matrix element 27 corresponds to pixel P in the image data, the image reproduction data for the gray level data for the pixel P are determined by referring to one of the look-up tables that corresponds to the pattern matrix element 27. That is, the look-up table corresponding to the matrix pattern 27 is referred to, and image reproduction data are read that constitute an output value relative to the gray level data of the input image data.

In each look-up table in the look-up table group (C), size data PW and position data PP for a virtual dot formed in the pixel area are included as image reproduction data relative to the input levels 0 to 255. In the look-up table the size data PW are stored as 0 to 255, and the position data are abbreviated as PP. The position data PP are data indicating, for example, the location in a pixel area whereat a virtual dot is to be formed in the main scanning direction, and specifically, are data indicating whether the laser drive pulse should be shifted to the right or the left in the pixel area. Further, the size data PW are data indicating, for example, the width of a virtual dot, and specifically, are data obtained by normalizing, to provide eight bits of data (0 to 255), the ratio of the laser drive pulse width and the width of a pixel area.

Therefore, the halftone processor 66, which is the image processor, refers to the look-up table and outputs the image reproduction data 30 that includes size data and position data that correspond to the input gray level. In accordance with the image reproduction data 30, the pulse width modulator 68 generates a drive pulse 69 corresponding to the virtual dot in the pixel area, and outputs the drive pulse 69 to the engine 70 in synchronization with the main scanning timing of the laser beam.

According to the transformation table in FIG. 4, since the position data PP and the size data PW are prepared for each of the input gray level data 0 to 255, the position and the size of a virtual dot formed in each pixel area can be set arbitrarily in accordance with the input gray level. Therefore, as is shown in FIG. 2, in accordance with the input gray level, a virtual dot can be formed on the right or on the left, or at a desired position.

Figure 5:
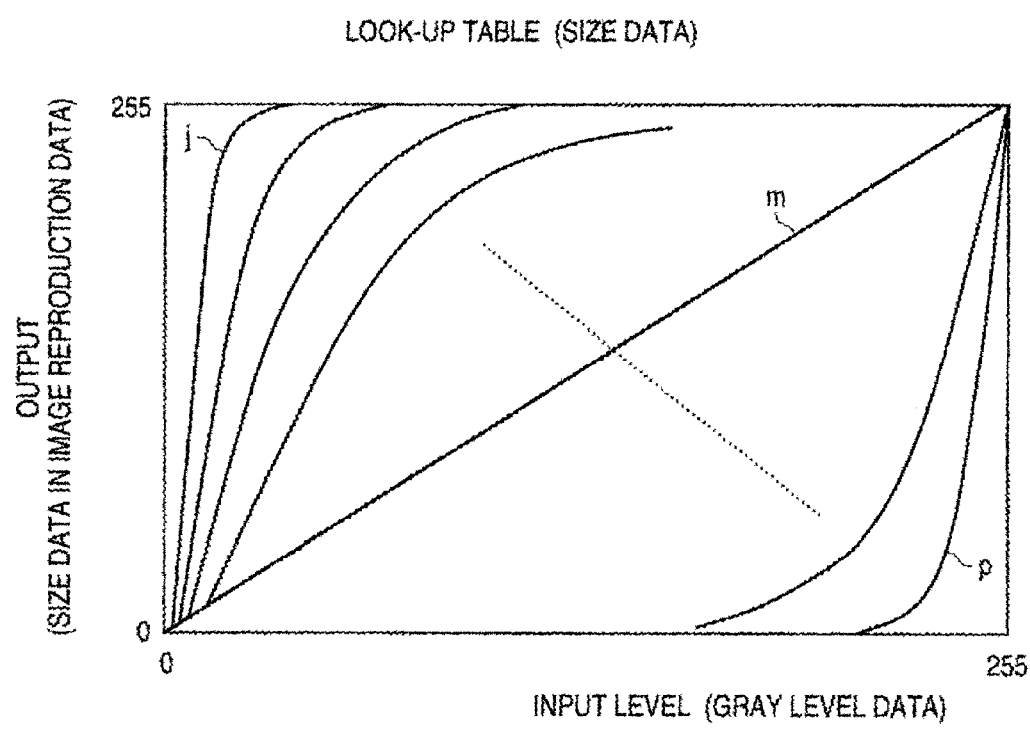
FIG. 5 is a diagram showing an example of look-up tables used to illustrate the relationship between input gray levels and size data in output image reproduction data.

FIG. 5 is a characteristic graph showing the relationship between an input gray level and the size data PW for the output image reproduction data. According to the characteristic graph, the output size data indicating the size of the pixel area wherein the laser beam should be emitted is plotted relative to the input gray level data of 0 to 255. An output 0 corresponds to a drive pulse width of 0, and an output 255 corresponds to the drive pulse width that is equal to the width of an entire pixel area. The characteristic line j represents an example of size data having a large value at a low input level. This characteristic corresponds to the size data in the look-up table that is referred to by an element in the pattern matrix that grows at a comparatively low gray level. The characteristic line m represents an example wherein the output level is substantially proportional to the input level, and corresponds to the look-up table that is referred to by an element in the pattern matrix that grows at a comparatively intermediate gray level. The characteristic graph p corresponds to the look-up table that is referred to by an element that does not grow at an input low gray level but that grows at a comparatively high gray level.

Figure 6:
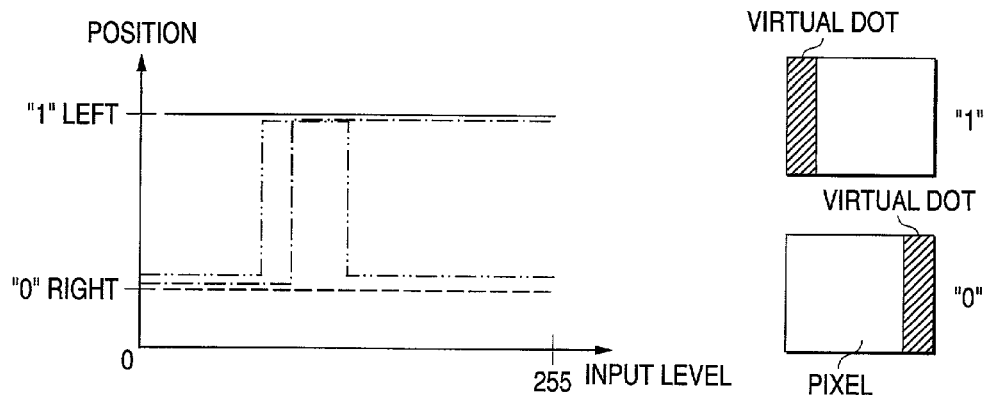
FIG. 6 is a diagram showing an example of look-up tables used to illustrate the relationship between input gray levels and position data in output image reproduction data.
Figure 6:
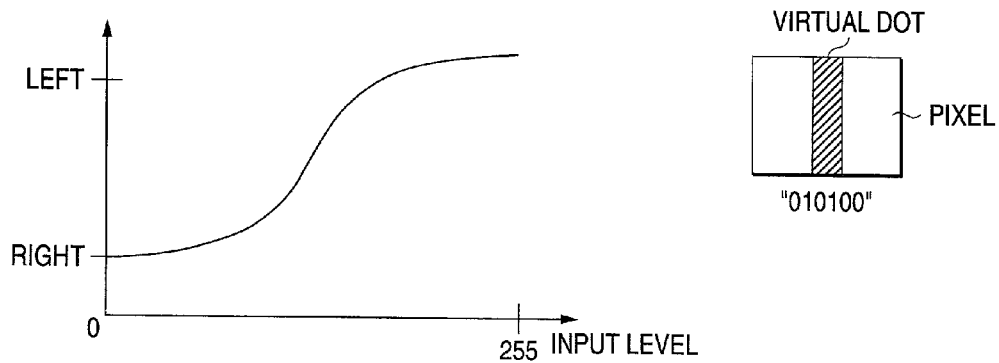

FIGS. 6(A) and 6(B) are look-up table characteristic graphs showing the relationship between the input gray level and the position of the output image reproduction data. When position data PP comprise one bit, as is shown in FIG. 6(A), the position data PP in the look-up table indicate either the left side of the pixel area (data (1)) or the right side of the pixel area (data (0)) relative to the input gray level. When the position data PP comprise multiple bits, e.g., six bits, as is shown in FIG. 6(B), the position data PP in the look-up table are those indicating 64 positions in a pixel area for an input gray level. Therefore, the position of a virtual dot in the pixel area can be sequentially changed as is shown in FIG. 6.

In the example in FIG. 4, since 144 look-up tables are correlated with the 12×12 pattern matrix, the characteristics of the size data in FIGS. 5 and 6 and the position data PP respectively constitute 144 types.

FIG. 7 is a diagram showing a transformation table of index type according to a second embodiment. In the first embodiment in FIG. 4, the transformation table includes 144 look-up tables for the 12×12 pattern matrix. However, in order to form a higher quality image, the use of a pattern matrix having a grater number of elements is required. This is because, when a larger pattern matrix is employed, various advantages, such as the setting of an arbitrary screen angle, can be realized.

In this case, when the look-up tables are respectively set to accommodate all the elements of the pattern matrix, an enormous memory capacity must be provided for the transformation table in the halftone processor 66. Generally, a fast semiconductor memory that can be quickly referred to, e.g., a static RAM (SRAM), is employed for the transformation table in this case. But the presence of such a large capacity, fast semiconductor memory constitutes a barrier to cost reduction.

In the second embodiment, therefore, differently sized data and position data can be set for each input gray level, while the amount of data stored by the transformation table is reduced. To do this, as is shown in FIG. 7, an index type transformation table is employed for the second embodiment.

In the index type transformation table, the look-up tables are arranged into a size look-up table group (first look-up table group) in FIG. 7(C-1), wherein gray level data and corresponding size data are stored for virtual dots; and a position look-up table group (second look-up table group) in FIG. 7 (C-2), wherein gray level data and corresponding position data are stored for virtual dots. In addition to the pattern matrix (B) that is correlated with multiple pixels in a predetermined area of a reproduced image, the transformation table includes size and position index tables (D-1) and (D-2) that indicate size look-up tables and position look-up table that can be referred to.

The look-up tables in the size look-up table group (C-1) are so arranged that the total number of tables is smaller than 144, the number of elements in the pattern matrix. That is, from the size look-up tables in FIG. 5 that have 144 characteristics, look-up tables having similar characteristics are grouped together to reduce the total number of tables. Similarly, the position look-up tables are grouped together so that the total number thereof is smaller than the number of elements, 144, in the pattern matrix. In other words, from among the position data look-up tables having the characteristics in FIG. 6, look-up tables having similar characteristics are grouped together to reduce the total number of tables. Thus, in the example in FIG. 7, 36 types of size look-up tables and 15 types of position look-up tables are provided.

Therefore, by referring, for example, to the size index table (D-1), the same look-up table, 17, is shown for elements 27 and 36 of the pattern matrix (B). Thus, the sizes of virtual dots having the same characteristic are set for the elements 27 and 36. Whereas, when referring to the position index table (D-2), different position look-up tables, 15 and 7, are shown for the elements 27 and 36. However, for elements 1 and 2, when referring to the size index table (D-1) different size look-up tables, 1 and 2, are shown, while when referring to the position index table (D-2) the same look-up table, 1, is shown.

As is described above, in the second embodiment, the look-up tables are arranged into size look-up tables and position look-up tables, and the pattern matrix and the index tables are employed to provide a combination of a size look-up table and a position look-up table to be referred to for each pixel. That is, the same look-up table and different position look-up tables are employed for pixels that correspond to elements 27 and 36. Further, the same position look-up table and different size look-up tables are employed for pixels that correspond to elements 1 and 2. Therefore, substantially, the usable look-up tables are a combination of position and size look-up tables, and the maximum number of table types available can equal a value obtained by multiplication by the number of tables.

In FIG. 7, the size index table (D-1) and the position index table (D-2) may be integrally formed to represent a combination of the size and position look-up tables for elements 1 to 144 of the pattern matrix (B).

FIG. 8 is a diagram showing another example index type transformation table according to the second embodiment. In this example, the pattern matrix and the index tables in FIG. 7 are formed together. That is, the 144 elements of a size pattern matrix (B-1) have reference numbers that indicate which of the size look-up tables (C-1) is to be referred to. Similarly, the 144 elements of a position pattern matrix (B-2) have reference numbers that indicate one of the position look-up tables (C-2) to be referred to. In the example in FIG. 8, as in FIG. 7, different position look-up tables 15 and 7 are referred to for two elements indicating the same size look-up table 27. Further, different size look-up tables 1 and 2 are referred to for two elements indicating the same position look-up table 1.

FIG. 9 is a specific diagram showing an example index type pattern matrix. Reference numbers for look-up tables to be referred to are provided for the elements of a 12×12 matrix. That is, this pattern matrix corresponds to the size pattern matrix or the position pattern matrix in FIG. 8. As is shown in FIG. 9, of the 144 elements, multiple elements (D1, 1), (D1, 4), (D2, 7), (D3, 10), (D7, 12) and (D10, 11) are correlated with the look-up table 1.

Figure 10:
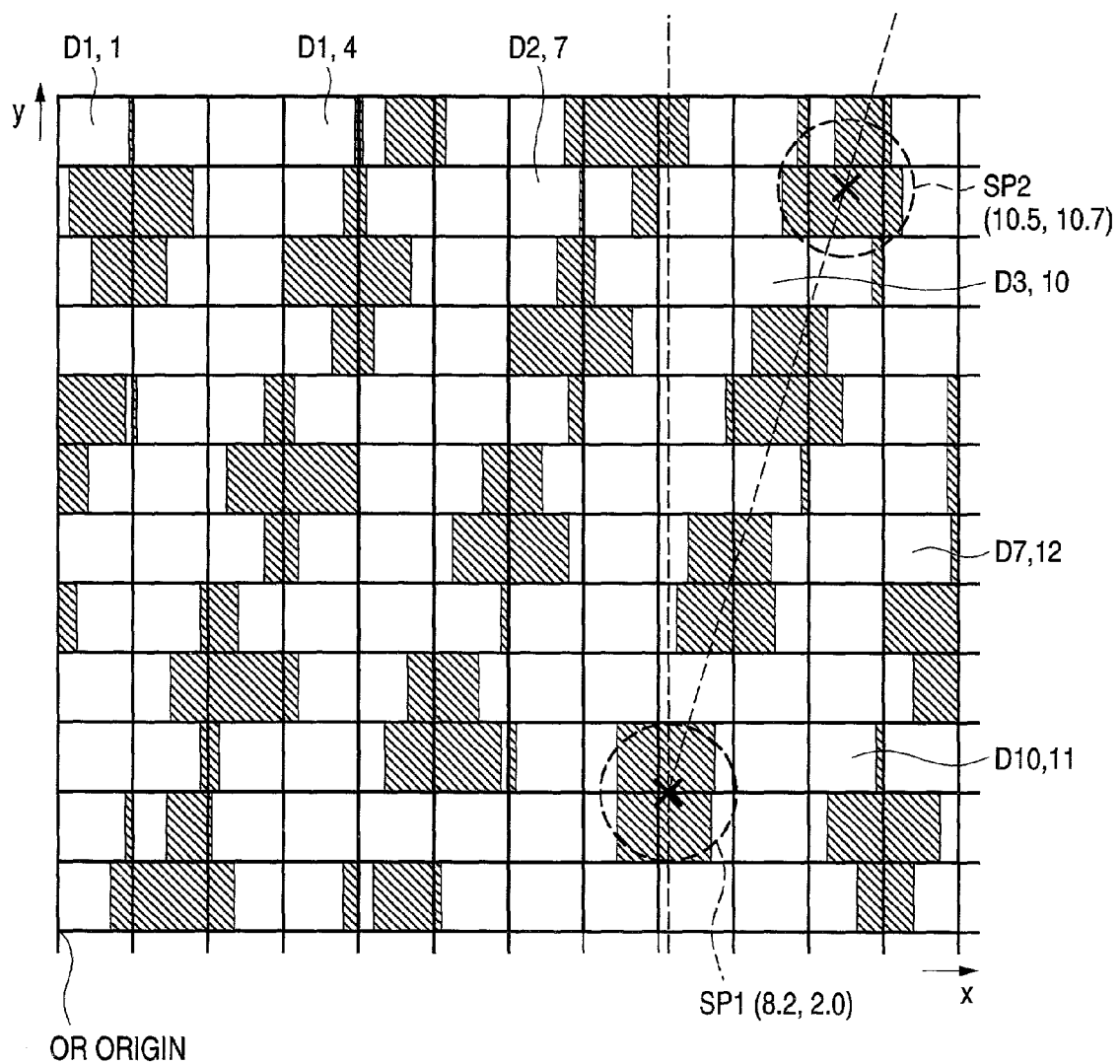
FIG. 10 is a diagram showing an example of halftone spots that have grown.

FIG. 10 is a diagram showing example halftone spots that have grown. In this example, the pattern matrix in FIG. 9 is supposed to be a size pattern matrix. Since the same size look-up table 1 is correlated with pixels that correspond to the elements (D1, 1), (D1, 4), (D2, 7), (D3, 10), (D7, 12) and (D10, 11), virtual dots (black portions) having the same size are formed.

FIG. 11 is a diagram showing an example transformation table for a third embodiment. In this example, the reference numbers of corresponding size look-up tables and position data PP for a virtual dot are stored in the pattern matrix (B), and only a group (C) of size look-up tables are provided as look-up tables. Therefore, for the transformation table in the third embodiment, for the element (D1, 1) the size look-up table 1 is referred to and only the fixed position data PP in the pattern matrix are employed. It should be noted that the position data PP are independently set for each element of the pattern matrix.

FIG. 12 is a diagram showing another configuration for an electrophotographic printing system. This system configuration is a modification of the configuration in FIG. 3. In the system in FIG. 12, a driver 80 installed in a host computer 50 includes a rasterization function 54, a color conversion function 64 and a halftone process function 66. The processing provided by the functions 64 and 66 correspond to the processing provided by the processors in FIG. 3 that have the same reference numbers. Image reproduction data (pulse width data and pulse position data) 30 are generated for each color by the halftone process function 66, are transmitted to a pulse width modulator 68 in a controller 62, which is incorporated into an electrophotographic apparatus 60, such as a page printer, and are converted into desired drive data (or a drive pulse) 69. The drive pulse 69 is then transmitted to an engine 70.

In the system in FIG. 12, the driver 80 installed in the host computer 50 performs color conversion and halftone processes. While in the example in FIG. 3 the color process and the halftone process are performed by the controller of the electrophotographic apparatus, in the example in FIG. 12 these processes are performed by the host computer 50. When a reduction in the price of the electrophotographic apparatus 60 is requested, this request must be coped with by reducing the capabilities of the controller 62. In this case, installing a driver program in the computer 50 is an effective way to implement the color conversion process and the halftone process, which constitute one part of the functions performed by the controller in FIG. 3. When the driver 80 implements the halftone process, a storage medium on which a program is stored to permit a computer to perform the halftone process is incorporated into the host computer 50.

In the embodiments of the invention, since look-up tables for pulse width data corresponding to the sizes of virtual dots and look-up tables for pulse position data corresponding to the locations of virtual dots are prepared in the transformation table of the halftone processor, a dot having an arbitrary size can be formed at an arbitrary position in accordance with the gray level data. Thus, by using a group of such dot images, a halftone spot having an arbitrary shape can be formed at an arbitrary position in accordance with the gray level.

For example, as is shown in FIG. 2, round halftone spots grow at a low gray level, and halftone spots in a line can grow at a gray level equal to or higher than the intermediate level, so that high quality images can be reproduced. Of course, when the center of a halftone spot is located at an arbitrary position in accordance with the position and the size of a virtual dot, an arbitrary screen angle can be defined using the positions of multiple halftone spots, and a high quality image having less moire can also be formed.

A color electrophotographic image forming apparatus using a laser beam has been explained. When the pulse width modulation direction is defined as the sub-scanning direction and the "right" or "left" positions in an image area are replaced by "upper" and "lower" positions, the present invention can be applied for an electrophotographic image forming apparatus using an LED line head. Furthermore, the present invention can also be employed for a monochrome electrophotographic apparatus. In this case, both a high tone reproduction capability and a high resolution capability can be obtained, and a high quality image can be output, while effects produced during image forming processing by the uneven feeding of paper by a drive system, environmental fluctuations and manufacturing variances are reduced.

The protective scope of the invention is not limited to these embodiments, and is also applied for inventions and their equivalents cited in the claims.

According to the image forming apparatus and method of the invention, image reproduction data can be generated whereby a virtual dot having an arbitrary size can be formed at an arbitrary position in accordance with a gray level.

What is claimed is:

1. An electrophotographic image forming apparatus, using a halftone spot consisting of multiple dot images formed in pixel areas so as to represent a gray scale and to reproduce an image, comprising:

a halftone processor for generating image reproduction data for each pixel by referring to a transformation table wherein gray level data for said image and correlated image reproduction data are stored, wherein said transformation table includes;

look-up tables, in each of which gray level data and correlated image reproduction data are stored;

and a pattern matrix, elements of which are so correlated with multiple pixels in a predetermined area of the image that each indicates a look-up table to be referred to; and wherein said image reproduction data stored by each of said look-up tables includes size data and position data for virtual dots, each of which corresponds to one of said multiple dot images.

2. An electrophotographic image forming apparatus according to claim 1, wherein said image reproduction data stored by at least one of said look-up tables includes different position data in accordance with gray level.

3. An electrophotographic image forming apparatus according to claim 1, wherein said position data for said virtual dots includes, in accordance with said gray level, either information indicating said virtual dots are located on a left in the pixel area or information indicating said virtual dots are located on a right in the pixel area.

4. An electrophotographic image forming apparatus according to claim 1, wherein said position data for said virtual dots includes position information concerning a location of said virtual dot in the pixel area that is consonant with gray levels, and wherein in at least one of said look-up tables, said position information is changed in accordance with said gray level.

5. An electrophotographic image forming apparatus according to claim 1, wherein, when the gray level of said image to be reproduced is a first level, halftone spots are grown while intervals are maintained, and wherein, when the gray level of said image to be reproduced is at a second level higher than said first level, said halftone spots are grown by being connected like a line.

6. An electrophotographic image forming apparatus, using a halftone spot consisting of multiple dot images formed in pixel areas so as to represent a gray scale and to reproduce an image, comprising:

a halftone processor for generating image reproduction data for each pixel by referring to a transformation table wherein gray level data for said image and correlated image reproduction data are stored; wherein said transformation table includes:

first look-up tables that each store gray level data and correlated first image reproduction data, including size data for virtual dots, each of which corresponds to one of said dot images;

second look-up tables that each store gray level data and correlated second image reproduction data, including size data for virtual dots, each of which corresponds to one of said dot images; and a pattern matrix, elements of which are correlated with multiple pixels in a predetermined area of an image and each indicate one of said first look-up tables and one of said second look-up tables that are to be referred to; and wherein number of said first look-up tables and number of said second look-up tables is smaller than number of elements of said pattern matrix.

7. An electrophotographic image forming apparatus according to claim 6, wherein said image reproduction data stored by at least one of said look-up tables includes different position data in accordance with gray level.

8. An electrophotographic image forming apparatus according to claim 6, wherein said pattern matrix is includes first and second elements that are correlated with the same first look-up table and different second look-up tables.

9. An electrophotographic image forming apparatus according to claim 6, wherein said pattern matrix is includes first and second elements that are correlated with different first look-up tables and the same second look-up table.

10. An electrophotographic image forming apparatus according to claim 6, wherein, when the gray level of said image to be reproduced is a first level, halftone spots are grown while intervals are maintained, and wherein, when the gray level of said image to be reproduced is at a second level higher than said first level, said halftone spots are grown by being connected like a line.

11. An electrophotographic image forming program product, using a halftone spot consisting of multiple dot images formed in pixel areas so as to represent a gray scale and to reproduce an image, permitting a computer to perform:
   a halftone process for generating image reproduction data for each pixel by referring to a transformation table wherein gray level data for said image and correlated image reproduction data are stored, wherein said transformation table includes: look-up tables, in each of which gray level data and correlated image reproduction data are stored; and
   a pattern matrix, elements of which are so correlated with multiple pixels in a predetermined area of an image that each indicates a look-up table to be referred to; and wherein said image reproduction data stored by each of said look-up tables includes size data and position data for virtual dots, each of which corresponds to one of said multiple dot images.

12. An electrophotographic image forming program product, using a halftone spot consisting of multiple dot images formed in pixel areas so as to represent a gray scale and to reproduce an image, permitting a computer to perform:
   a halftone process for generating image reproduction data for each pixel by referring to a transformation table wherein gray level data for said image and correlated image reproduction data are stored; wherein said transformation table includes:
      first look-up tables that each store gray level data and correlated first image reproduction data, including size data for virtual dots, each of which corresponds to one of said dot images;
      second look-up tables that each store gray level data and correlated second image reproduction data, including size data for virtual dots, each of which corresponds to one of said dot images; and a pattern matrix, elements of which are correlated with multiple pixels in a predetermined area of an image and each indicate one of said first look-up tables and one of said second look-up tables that are to be referred to; and
   wherein number of said first look-up tables and number of said second look-up tables is smaller than number of pixels in said pattern matrix.

13. An electrophotographic image forming apparatus, using a halftone spot consisting of multiple dot images formed in pixel areas so as to represent a gray scale and to reproduce an image, comprising:
   a halftone processor in the electrophotographic image forming apparatus for generating image reproduction data for each pixel by referring to a transformation table wherein gray level data for said image and correlated image reproduction data are stored,
   wherein said transformation table includes:
      look-up tables in which gray level data are stored along with correlated image reproduction data, and
      a pattern matrix, elements of which are correlated with multiple pixels in a predetermined area of the image and each indicate one of said look-up tables to be referred to, and
   wherein, in addition to said look-up tables to be referred to, said pattern matrix includes position data for virtual dots, which each correspond to one of said dotted images.

* * * * *